United States Patent [19]

Chick

[11] Patent Number: 4,552,183

[45] Date of Patent: Nov. 12, 1985

[54] REPAIRING LEAKS IN PIPELINES CARRYING FLUENT MEDIUM

[75] Inventor: Douglas K. Chick, Hertfordshire, England

[73] Assignee: Readyseal Limited, Northampton, England

[21] Appl. No.: 624,775

[22] Filed: Jun. 26, 1984

Related U.S. Application Data

[63] Continuation of Ser. No. 396,616, Jul. 9, 1982, abandoned, and a continuation-in-part of Ser. No. 128,588, Mar. 10, 1980, Pat. No. 4,357,961, which is a continuation-in-part of Ser. No. 900,372, Apr. 26, 1978, abandoned, which is a continuation of Ser. No. 686,334, May 14, 1976, abandoned.

[30] Foreign Application Priority Data

May 14, 1978 [GB] United Kingdom ............... 20248/75

[51] Int. Cl.⁴ ............................................. F16L 55/16
[52] U.S. Cl. ........................................ 138/99; 138/92; 138/97; 285/15
[58] Field of Search ........................ 138/97, 99, 92, 89; 206/219, 221, 223, 225, 568, 582, 484; 285/15, 373; 29/202.01, 402.09; 428/65, 131, 137

[56] References Cited

U.S. PATENT DOCUMENTS

| | | | |
|---|---|---|---|
| 3,141,478 | 7/1964 | Copeland | 138/99 X |
| 3,394,738 | 7/1968 | Baron et al. | 138/99 X |
| 3,432,188 | 3/1969 | Turnek | 138/99 X |
| 3,550,638 | 12/1970 | Smith | 138/99 |
| 3,563,276 | 2/1971 | Hight et al. | 138/99 |
| 4,086,934 | 5/1978 | Bagwell et al. | 138/99 X |

FOREIGN PATENT DOCUMENTS

624433  7/1961  Canada ................................. 138/99

Primary Examiner—James E. Bryant, III
Attorney, Agent, or Firm—Fred Philpitt

[57] ABSTRACT

A repair structure for the repair, mainly, of leaking pipelines. The repair structure is a bandage of absorbent material impregnated with a curable resin. The bandage is wrapped round the pipeline to form a hard seal casing when the resin cures. The bandage preferably comprises also an impermeable membrane and a vent to allow leaking medium to escape while the bandage is being applied, with the membrane innermost, and while the resin is curing. The vent comprises a bush cast around a vent sleeve and bonded to the membrane. The resin which is used to form the vent bush and the membrane is the same as that used for the impregnation of the absorbent layer so that such layer will bond to the membrane. The sleeve is removable and can be replaced by a solid plug to seal the vent bush when the rigid seal casing is formed. The casing extends over a gallery in the region of the joint so that it will act as a bellow and accomodate large relative pipe section movements without failing. The joint seal is completed by applying a film of plastics material again preferably of the same resin, to the outside of the impregnated bandage before curing of the resin so that the film will bond to the resin when cured. The film may be wrapped over the vent provided each wrapping is punctured at the vent to allow the medium to continue to escape until the resin has cured.

5 Claims, 19 Drawing Figures

REPAIRING LEAKS IN PIPELINES CARRYING FLUENT MEDIUM

This is a continuation of application Ser. No. 396,616 filed July 9, 1982, now abandoned, and the benefits of 35 USC 120 are claimed relative to it.

This invention relates to the art of repairing leaks in pipes and pipelines, and also holes in vessels, and to apparatus for use in connection with the method. The present application is in continuation-in-part of application Ser. No. 128,588, now U.S. Pat. No. 4357961, which is a continuation-in-part of application Ser. No. 900,372 which is a continuation of application of application Ser. No. 686,334, the said application Ser. Nos. 900,372 and 686,334 being now abandoned.

A particular application of the invention concerns the repairs of a leak in a pipeline which carries a fluent medium under pressure, and in relation to which it is not possible or practicable to stop the flow of the fluent medium whilst the leak is being repaired. Such an application may be for example, the repair of a leak in a pipeline which carries natural or town gas. When there is a leak in such a pipeline, because the gas is toxic and combustible, a potentially dangerous situation has arisen. Frequently, the leak will be such as not normally to justify replacement of the pipeline section in which the leak exists, but in actual fact in practice this is what happens, as heretofore efficient leak repairing methods have not been available. Also, when a pipeline section has to be replaced, it is necessary to shut off the flow of gas whilst repairs are effected, which means that many homes may be without gas for a long period, which is inconvenient and leads to the inocurment of extra costs. The most common location in a pipeline for a leak to occur, is at a joint, and leaks at joints can be more difficult to repair than when the leak occurs in the pipeline between joints.

In one known method for sealing leaks in pipelines carrying fluent medium under pressure, a pair of rigid cocoon shells are placed around the pipeline in the vicinity of the leak. One of these shells has an integral vent. The shells when on the pipe are wrapped by means of an absorbent bandage which is impregnated with a curable synthetic resin. The resin forms the sealing medium for the shells, and the leaking gas escapes through the vent. When the resin sets hard, sealing the shells together and to the pipeline, the vent is sealed completing the repair. Moreover, different shells are required for different sizes and types of joints and the method does not lend itself to ball and spigot junctions.

This known method has several disadvantages, one being that the shells, being rigid, must be a reasonably neat fit on the pipeline, otherwise effective sealing of the shells to the pipeline will not be possible. Also, the rigid shells are space consuming, and the transportation of many of the shells is difficult.

The present invention aims to provide a method of repairing leaks in pipelines whereby the aforesaid disadvantages are obviated or mitigated.

In accordance with a first aspect of the invention, a leak in a pipeline is repaired by wrapping around the pipe a flexible bandage consisting of or including resin absorbent material, said bandage including an integral vent bush firmly secured thereto providing an easy access route for the medium leaking from the joint, the method further including soaking the absorbent material in curable resin before or after application of the bandage, allowing or effecting curing of the resin, and finally sealing said vent by means of a plug. By the aforesaid method, it will be seen that an effective seal can be provided without the fear of gas or other fluid medium such as water along the pipeline being terminated.

The bandage preferably comprises a layer of resin absorbent material and a plastics material membrane to which the vent means is sealingly secured.

Upon initial wrapping of the pipeline, usually a joint the medium leaks freely through the vent means, so that the leaking medium does not tend to force its way past the resin soaked layers, and eventually the vent is sealed when the resin has cured sufficiently.

Preferably, the absorbent material is fibrous felt, and it is preferred that the plastics membrane is of polyurethane of a thickness of the order of one (1) thousandth of an inch. The vent bush may be a short length of tubing which passes through a hole in the bandage and is bonded in an air tight manner to the membrane by means of polyamide, polyurethane or epoxy resin depending upon the nature of the resin which is used for the impregnation; the resin is selected so that it will bend the membrane to the absorbent layer.

It is preferred that the said vent bush comprise a resin casting cast in situ with a sleeve defining the bore of the bush and with the membrane in position so that the sleeve can be removed after the casting has set and the bandage has been applied, and the hole in the casting left by removing the sleeve can be sealed by means of a plug of corresponding diameter.

Preferably also, the method includes applying a covering wrapping of plastics material film, normally of the same material as the membrane, over the bandage after it has been applied to the pipe and before the resin on the absorbent material is cured, the plastics material wrapping film being tensioned so as to hold the bandage tightly in contact with the pipe.

The resins which are used in connection with the apparatus of the invention are multi-part resins. That is to say two or more constituents or parts of the resins must be brought together to initiate curing. For example, if the resin is an epoxy, basically the parts are a resin part and a hardener. If the resin is a polyurethane, the parts are a resin part and an isocyanate. The resin may be a three or even four part resins, additional parts being catalysts and or accelerators and retarders.

The invention also envisages the use of a bandage which may or may not have a vent means in the case of sealing ball and spigot joints. According to this aspect of the invention there is provided a method of repairing a pipeline leak at a ball and spigot joint, wherein a supporting collar is applied at the shoulder of the joint in order to create a gallery at the shoulder in the finished joint and to support the joint sealing means, applying the joint sealing means in the form of a flexible bandage of resin absorbent material which is impregnated with a curable synthetic resin so that the bandage overlies the collar and overlaps same at the edges so that the bandage is applied to the pipe sections defining the ball and spigot joint, and curing or allowing the resin to cure to form a rigid seal casing which is anchored to the respective pipe sections and extends over the gallery so that the rigid casing can expand and contract to accommodate relative deflections between the pipe sections.

An embodiment of the invention will now be described, by way of example, with reference to the accompanying drawings, wherein.

Figure 1A:
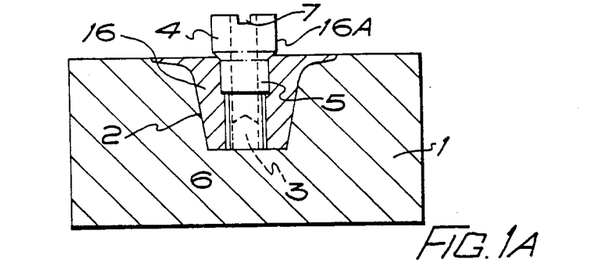
FIGS. 1A to 1C show in sectional elevation the stages in the manufacture of a bandage according to the invention.
Figure 1B:
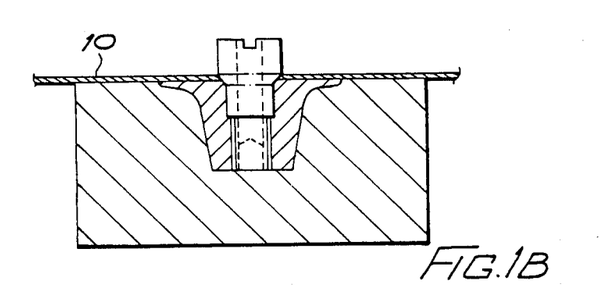
Figure 1C:
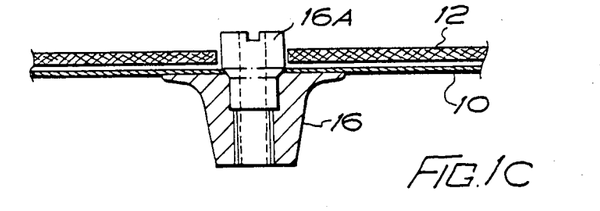

Referring to the drawings, and firstly to FIG. 1C, a bandage for use in the invention is shown in section, and will be seen to comprise a layer of plastics membrane 10, in this case a polyurethane film of a thickness of approximately one (1) thousandth of an inch. On one side of the film 10 is an absorbent layer 12, this absorbent layer in this example being of polypropylene felt. A vent bush in the form of a short internally threaded cylindrical casting 16 having a liner sleeve 16A is bonded to the underside of film 10 and the sleeve 16A, passes completely through the laminate as shown. The felt 12 is simply passed over the upper end of the sleeve 16A. The bonding of the membrane 10 to casting 16 effects a gas tight seal at the joint between the vent bush and the bandage.

Figure 1D:
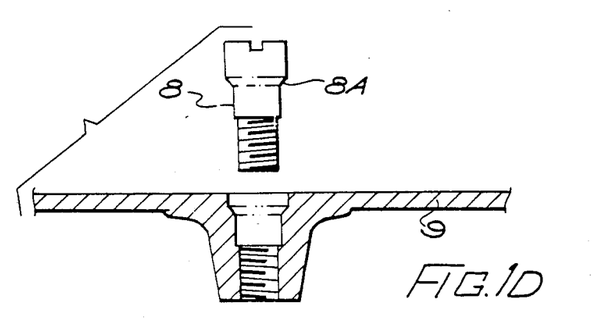
FIG. 1D is a section elevation showing how the joint is finally sealed.

FIGS. 1A, 1B and 1C indicate how the bandage is constructed. A casting mould 1 has a casting 2 shaped to the shape of casting 16. A pin 3 of the mould receives the sleeve 16A in operative position in the mould cavity 2. The sleeve 16A as a head portion 4 an intermediate portion 5 and a lower threaded portion 6 of progressively decreasing diameters and is of plastics material. The head portion has a screwdriver slot 7. The resin to form the casting 16 is cast in cavity 2 with the sleeve 16A therein by pouring the fluent resin into cavity 2 and then as shown in FIG. 1B, before the resin sets, the membrane 10 is applied over head portion 4 and bonds sealingly to the top surface of the resin. The sleeve 16A is of a plastics material which does not bond to the resin and therefore when the resin has set, the sleeve 16A can be unscrewed from the casing 16 to be replaced by a solid plug 8 as shown in FIG. 1D of the same outer shape as the sleeve 16A. O-ring seal 8A for ensuring good sealing of the vent in the finished joint. FIG. 1D also shows that the felt 12 has been impregnated with resin and that resin has cured giving a homogenous joint sealing casing 9. To this end, the resin which is used for impregnating the felt 12 is the same as that used for the casting 16 and therefore the impregnated felt will bond securely to the membrane 10, which may also be of the same resin, and to the casting 16.

Figure 2:
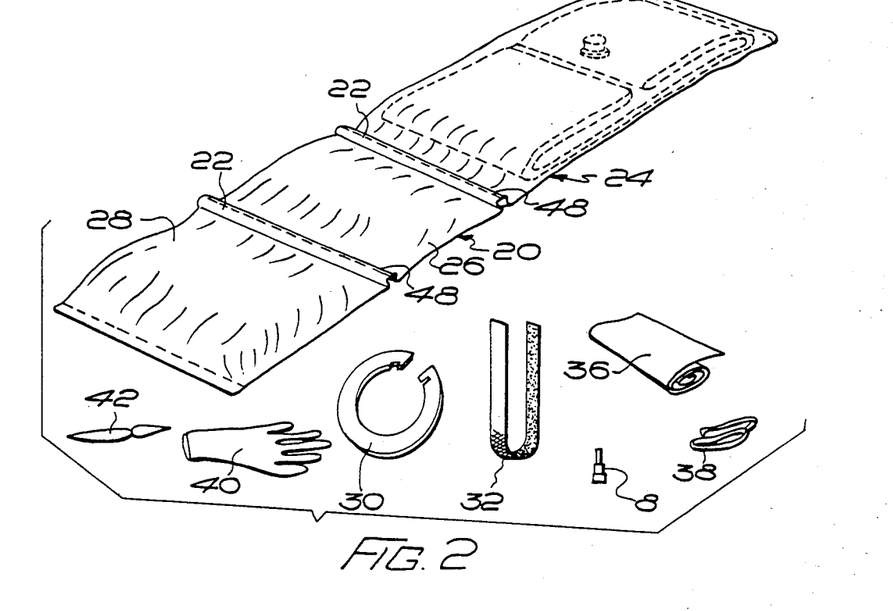
FIG. 2 is a perspective view of the components of a kit, including a bandage as shown in FIG. 1C for the repairing of a leak in a pipe joint.
Figure 3:
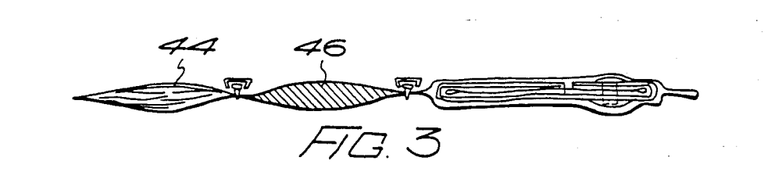
FIGS. 3 and 3A respectively are sectional elevations of the package of the kit shown in FIG. 2; and the detail ringed in FIG. 3.
Figure 3A:
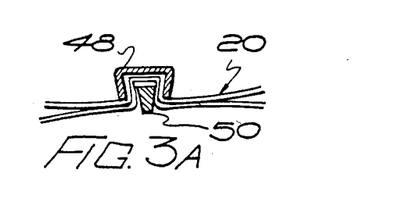
Figures 4, 6:
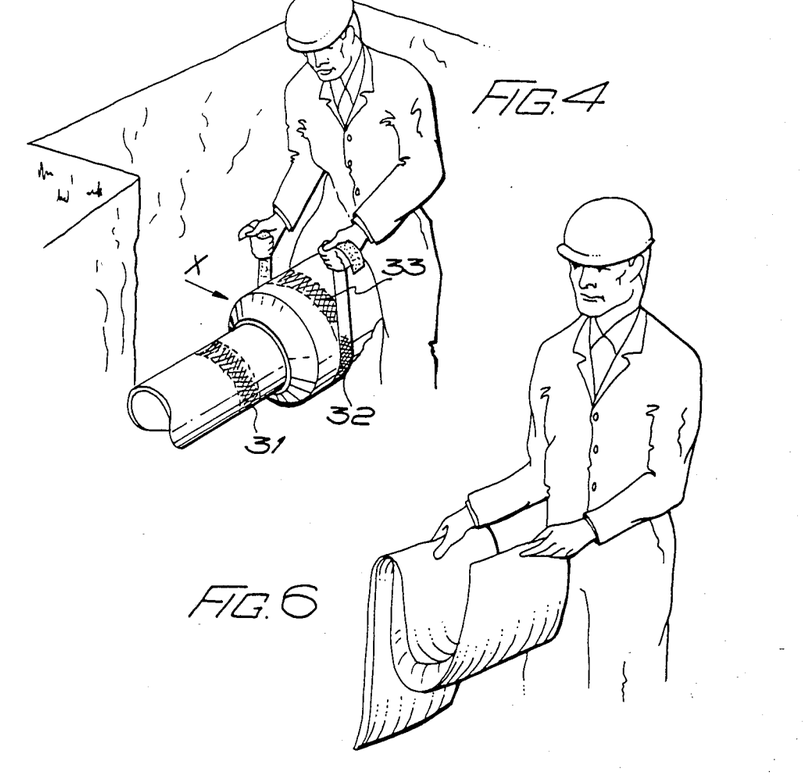
FIGS. 4 to 12 illustrate respectively, and in perspective view, the steps involved in applying the wrapping to a leaking pipe joint.

FIG. 2 shows a kit which is for use in repairing a leak at a ball and spigot pipe joint such as is illustrated generally by reference numeral X in FIG. 4. The kit comprises a package 20 of which a sectional elevation is illustrated in FIG. 3 and in detail in FIG. 3A, and this package contains the bandage described with reference to FIG. 1. The package 20 is in fact a sealed sachet bag or envelope of a three layer material comprising nylon-surlin-polythene. Transversely of the length of the bag the sides are clipped together by means of plastic clips 22 so that in fact the bag is divided into three separate compartments 24, 26 and 28. Compartment 24 contains the bandage of FIG. 1 whilst compartment 26 contains one part of the resin to be applied to the bandage and compartment 28 contains the other part of the resin, such as a hardener for the resin in compartment 26. The resin system it will be appreciated is a two part system, and in actual fact is a polyurethane resin system. Only sufficient of the resin and hardener are included in the package to ensure that there is effective impregnation of the bandage without excess or starvation. The clips 22 serve to keep the resin parts separate and out of contact with the bandage in compartment 24 until such times as the bandage is to be used, when the clips 22 are removed in sequence permitting first the two parts of the resin system to intermix and secondly to enable the resin system to soak the wrapping as will be explained hereinafter.

The surlin of the bag gives the bag a puncture proof property, and the polythene, which is the inner layer, is inert to the resin catalyst or hardener contained in compartment 28.

For some hardeners, the compartment 28 is lined with a sleeve of metal foil or the like, the ends being sealed closed by clips 22, to stop the ingress of moisture to such an extent as to cause contamination of the hardener. When a polyurethane resin system is used the whole package 20 is contained within a foil bag containing a dessicant such as silica gel to extend the shelf life up to two years.

In addition, the kit contains a collar 30 for fitting round pipe joint X as will be explained, an abrasive cleaning strip 32 for cleaning the pipe joint prior to application of the wrapping, the sealing plug 8 for sealing the vent means, a wrapping strip 36 of polyurethane film, elastic bands 38 for holding the collar 30 in position until the wrapping has been applied, gloves 40 for the operator's use, a knife 42 for slitting the bag 20 at the appropriate time as will be explained, and, when a polyurethane system is used, a tin of primer, and a disposable paint brush for applying same.

FIG. 3 shows a section through the bag 20, the hardener and resin being indicated at 44 and 46. The compartments 24, 26 and 28 are formed by clipping the faces of the bag together by means of the clipping arrangement shown in FIG. 3A. This comprises a plastics material strip of tapered U section 48 and an inner wedge strip 50 which fits in the U section, trapping the layers of the bag 20 therebetween and effectively sealing the compartments 28, 26 and 24 one from another. In order to interconnect the compartments, it is simply a matter of removing the clipping arrangement 22 either by sliding the strips 48 and 50 one relative to another, or by springing off strip 48.

The collar 30 is of cardboard but may be of other material such as flexible foam shaped to give a desired profile to the finished seal.

The felt material used for the layer 12 is needled felt.

In order to repair a ball and spigot pipe joint, the joint regions 31 and 33 are first of all cleaned using the abrasive strip 32 as shown in FIG. 3. It will be noticed in this figure that an excavation around the pipe joint has been shown to enable access thereto by an operator.

Figure 5:
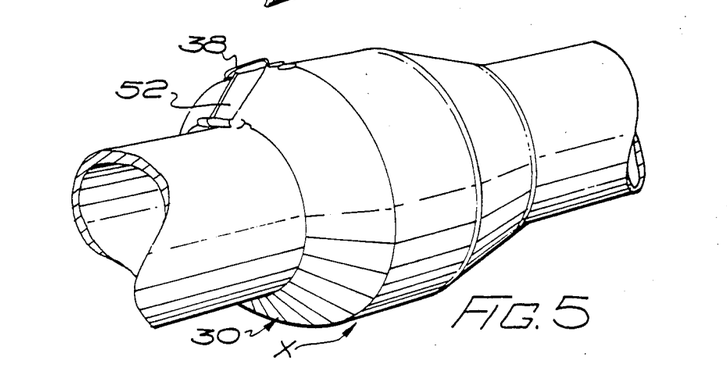

Referring now to FIG. 5, the collar 30 is shown in position. It is to be noted that the collar is split, the ends are sprung apart to allow it to be positioned as shown, and eventually the ends are held adjacent by means of the elastic bands 38. It is to be noted that the collar is designed to leave a gap 52 into which the vent casting 16 can fit in the subsequent application of the bandage. The purposes of the collar 30 are to maintain a leakage path to the vent 16, 16A to provide a more suitable profile for supporting the bandage, and to create a gallery to postion the rigid seal to a greater deflection of the joint without failure.

FIG. 6 illustrates the next stage of the method. The operator removes the clip 22 of the package 20 separating compartments 28 and 26 to allow the two parts of the polyurethane resin system to mix, and indeed he promotes the mixing by raising and lowering the respective ends of the now enlarged compartment 26 and 28 as illustrated in FIG. 6. This mixing process is continued approximately for 1 minute.

After the completion of the mixing of the two parts of the resin system, the other clip 22 is removed and the mixed resin is allowed to pass into contact with and to soak the bandage in the compartment 24. The operator at this stage kneads the resin mix into intimate contact with as much of the wrapping as he can. In any case, the needle felt is extremely absorbent and will soak up the resin mix effectively wetting out all of the bandage. Effective and complete soaking of the bandage and therefore effective distribution of the resin is achieved without the operators hands having any possibiliy of contact with the resin and this represents a major advantage in this art. Also, there is no possibility of any spillage or loss of resin, or contamination by the resin as it remains within the sealed envelope. The quantities of the resin parts will of course be matched to the bandage size so that substantially all of the resin is absorbed by the bandage. The envelope therefore forms a metering device in containing the correct amount of resin for the bandage held thereby. In comparison, when the resin is applied to a bandage conventionally and in the open air, it is not so easy to apply the resin effectively. If the resin is applied to a bandage before its use effective soaking of the bandage can only be achieved with great care or by use of expensive equipment, and if the resin is applied after the bandage has been applied to, say, a pipeline care must be exercised in order that the resin will be applied effectively, as it is difficult to make the resin penetrate through the whole thickness of the bandage layer in a homogeneous manner. However, it is within the scope of this invention to apply the resin by hand or other means rather than to use the compartmentalised package system described.

Figure 7:
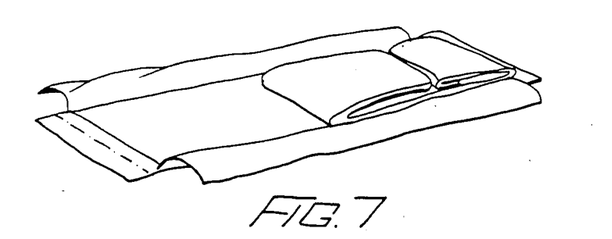
Figure 8:
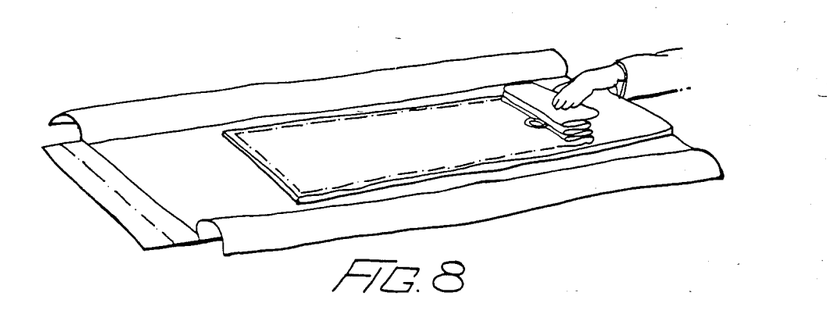
Figure 9:
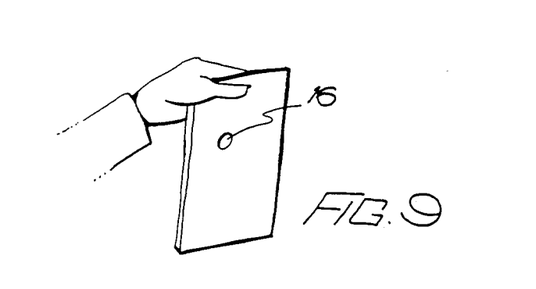

Upon completion of manipulating step to soak the bandage in resin, the operator now puts on the gloves 40 and uses knife 42 to slit open the bag 20 as illustrated in FIG. 7, whilst the bag lies horizontally on the ground. This exposes the bandage as shown in FIG. 7 and he unfolds the bandage at one end and unfolds the membrane 10 which previously had been folded so that it overlies the unfolded end of the bandage as shown in FIG. 8. Using his gloved hands, the operator applies excess resin to the surface to which the bandage is to be applied. Next, the other end of the bandage is folded concertina fashion so that he can grip the folded end as shown in FIG. 8. He then holds up the wrapping in suspended manner as shown in FIG. 9 with the vent casting 16, nearer the top and short edge of the bandage which as will be appreciated is of rectangular form.

Figure 10:
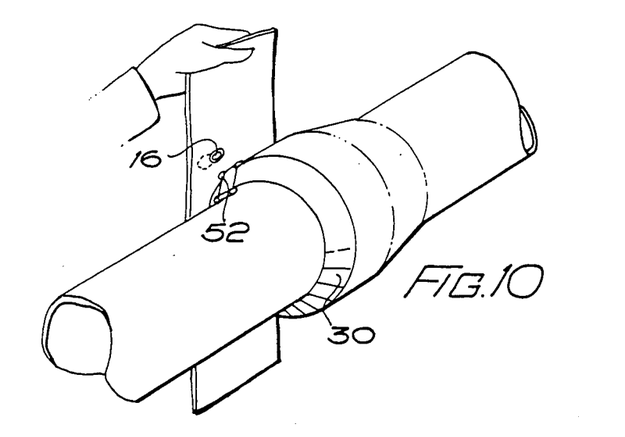

The operator now applies the soaked bandage to the pipe joint with the collar 30 already attached as shown in FIG. 5, positioning the vent casting 16 in the gap 52. The collar 30 is located so that one of the shorter ends, the end which the operator is shown holding in FIG. 10, will lie on top of the pipeline. This end he opens out so that the membrane 10 is exposed, the layer 12 being folded back. The other end he now places in overlapping relationship with the membrane 10 thereby to complete the wrapping of the membrane which forms a barrier to the leaking fluid, and finally the folded over end of layer 12 is placed into overlapping relationship with said other end to complete the wrapping.

Figures 11, 12:
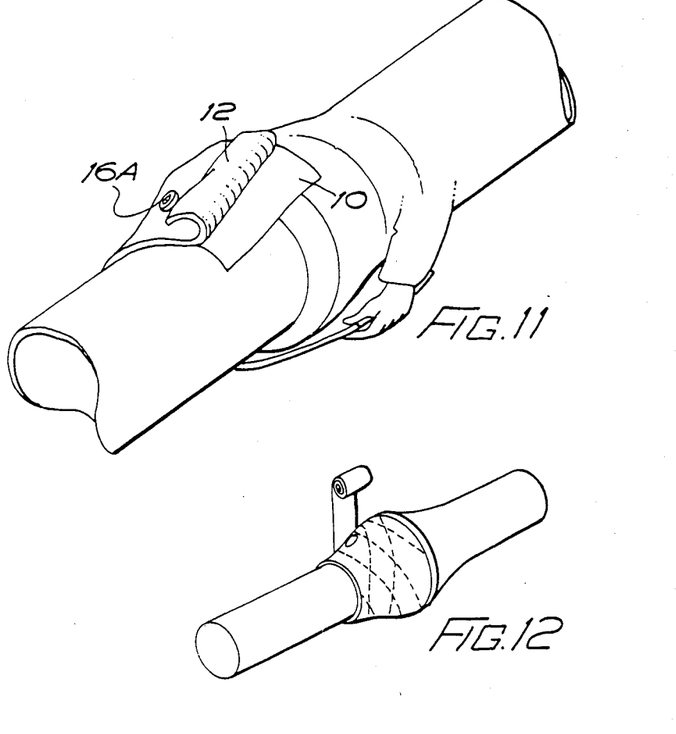

The wrapping strip 36 is now applied over the bandage as shown in FIG. 12. In applying the wrapping strip, the operator can take this over the vent sleeve 16A provided he continues to puncture the wrapping strip at the vent tube to permit the continued escape of the fluent gaseous medium being carried by the pipeline, avoiding the build up of internal pressure at the joint. The wrapping strip is applied initially to the smaller diameter of the pipe joint.

It is to be noted that this work must be performed within the cure time of the resin. The cure time can be controlled by the selection of the resin ingredients and the cure time should be neither too short nor too long consistent with the work to be performed.

When the resin has cured sufficiently, the sleeve 16A is removed from the casting 16 to expose the clean inner threaded surface of the casting 16 and this is eventually plugged using the threaded plug 8 in order to complete the repair. The plug 8 is of course threaded into position but in alternative arrangements it may be cemented and/or hammered or forced into position. It is to be noted that the wrapping strip is applied to the bandage whilst the resin is still fluid, and being of a polyurethane film, applied under tension will compress the bandage onto the pipe, and will also bond to the resin.

By embodying a polyurethane membrane 10 in the wrapping there is provided the advantage that the leaking gas will not tend to permeate through the wrapping as a whole, but will flow towards the vent 16, 16A.

Although it will normally be desirable first of all to clean the outside of the pipeline where this is rough and uneven, or pitted or the like, in other cases initial preparation of the pipeline surface may not be necessary.

Figures 12A, 12B:
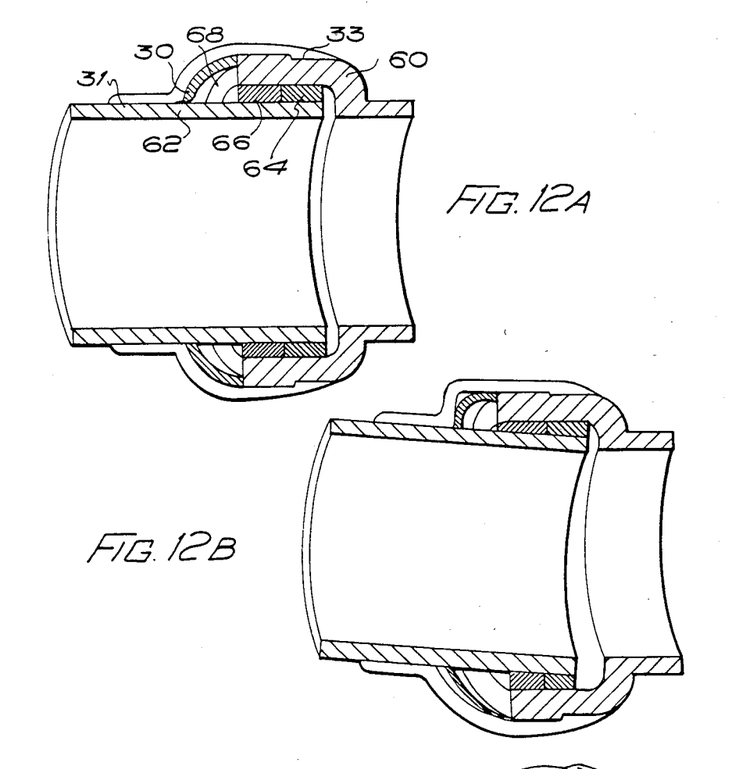
FIGS. 12A and 12B illustrate in sectional elevation the sealed pipe joint in an undeflected and in a deflected condition respectively.

Referring to FIGS. 12A and 12B, the completed joint is shown in section in FIG. 12A, the respective ball and spigot connections being illustrated by numerals 60 and 62. The joint is shown as having conventional lead yarn packing 64, 66. The support collar 30 is shown and it will be seen that a gallery 68 is defined at the shoulder of the joint whereby the rigid seal, anchored at regions 31 and 33 to the pipe sections 62, 60 extends over the gallery 68 and therefore is ideally located for absorbing relative deflections between the pipe sections 60, 62 such as the relative tilting between the sections as shown in FIG. 12B. The deflections are absorbed by deformation, compression and stretching of the seals, which would not be possible if the gallery 68 were not created and if the gallery were filled with the resin used for forming the seal. By constructing the seal as a bellows type of convolution the thickness of the cured resin is furthermore kept as low as possible to enable the said deformation to take place. In any event the resin will be selected to have intrinsically and flexible characteristics so that large pipe section movements can be accommodated safely.

The method is inexpensive and efficient, and can be carried out very quickly by unskilled labour. The results are extremely encouraging, and it is to be noted that other resins, felt and plastics film material can be used without departing from the scope of the invention.

Although the embodiment of the invention described has illustrated the repair of a leak in a pipeline at a pipe joint, it is to be understood that the method can be applied at other locations in the pipeline other than at ball and spigot joints. For example, the method can be applied at butt joints or merely where the pipe is leaking, but in such cases a special collar to create a gallery and to cause the seal to end up as a bellows convolution is required.

The concept of having a multi-part resin and a bandage or absorbent patch which is isolated but selectively connectible compartments of a sealed envelope is another aspect of the present invention, and this aspect has wider application than the specific application described. Thus, for other applications, the vent 16, 16A may be omitted, and the soaked bandage can be used for joining pipes, for repairing pipes before use or pipes through which the flow of fluent medium has been temporarily suspended, when the bandage is in the form of a patch, for repairing motor vehicle bodies household goods, vessel walls and the like. In each case, the sealed envelope contains in the appropriate compartments the resin parts in the correct quantity for the bandage which is in another of the envelope compartments and the resin parts are capable of being mixed in a first step and then the mixture applied to the bandage or patch in the second step, before the envelope is open, with all of the attendant advantages as set forth herein.

Figure 13:
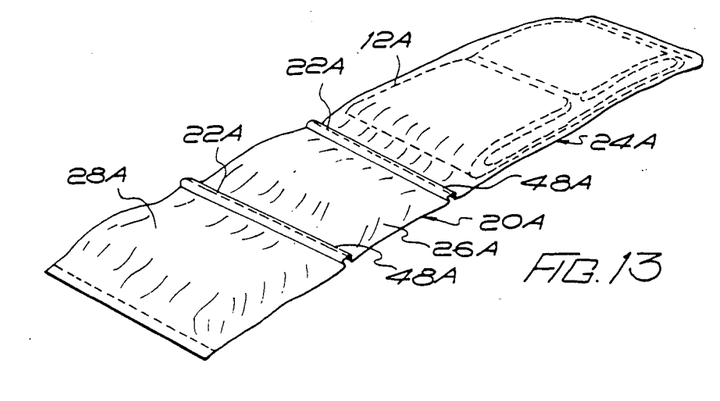
FIG. 13 shows a package according to another embodiment of the invention, in a view similar to FIG. 2.

FIG. 13 shows an alternative embodiment of the invention in which an envelope 20A is provided, which is the same as the envelope 20 of FIG. 2. The envelope 20A is similarly compartmentalised as shown in 24A, 26A and 28A. Compartments 28A and 26A contain the the same resin system parts as contained in compartments 28 and 26 in the FIG. 2 embodiment, and similar removable clips 22A/48A are provided to define the compartment 24A and 26A. A single bandage 12A is provided in compartment 24A but the bandage 12A has no vent similar to vent 16, 16A in bandage 12 of the FIG. 2 embodiment, nor has it any film 10, but otherwise the bandage 12A is the same as bandage 12.

The bandage 12A is impregnated by removing one clip 22 to intermix the resin parts and then to remove the second clip 22 to impregnate the bandage 12A before the envelope is opened, as described in relation to the previous figures. The bandage 12A can be used for joining pipes or for repairing leaks in pipes or for patching or repairing holes or wasted areas in any suitable substrate. The collar 30, plug 34 and bands 38 may not be required.

As in the previous embodiment, only the correct volumes of the resin parts for the size of bandage 12A are included in the compartments 29, 26.

I claim:

1. Apparatus for use in repairing a pipe leak comprising a flat sheet bandage for wrapping around the pipe in the vicinity of the leak, the bandage being flexible and comprising a laminate of an inner flexible first layer of a synthetic resinous material which is adapted to bear directly against the exterior of the pipe and which is of sufficient size to cover the outer circumference of the pipe and which is integrally attached to a vent bush, which is also of synthetic resinous material, and a second flexible layer of a resin absorbent material through which the vent bush passes, said second layer also being dimensioned to cover the outer circumference of the pipe, said first and second layers being coextensive in area.

2. Apparatus according to claim 1 wherein said vent bush is a casting bonded to one side of said first layer and is composed of the same synthetic resinous material as that of said first layer.

3. Apparatus according to claim 2 wherein the casting is a generally cylindrical vent bush to one end of which said first layer is bonded and said casting is screw threaded to receive a sealing plug.

4. Apparatus according to claim 2 wherein said second layer is impregnated with a synthetic resin material that is the same synthetic resin as said casting.

5. Apparatus according to claim 1 wherein said first layer is a polyurethane film and said second layer is polypropylene felt.

* * * * *